United States Patent [19]

Sugiura et al.

[11] 4,003,059
[45] Jan. 11, 1977

[54] OPTICAL RECORDER HAVING FOCUS CONTROLLING MEANS

[75] Inventors: Yoshinori Sugiura; Kiyonobu Endo, both of Yokohama; Kimio Kono, Kawasaki; Hideaki Sato, Tokyo, all of Japan

[73] Assignee: Canon Kabushiki Kaisha, Tokyo, Japan

[22] Filed: Jan. 30, 1975

[21] Appl. No.: 545,746

[30] Foreign Application Priority Data

Feb. 7, 1974 Japan ............................ 49-15735
Feb. 15, 1974 Japan ............................ 49-18827

[52] U.S. Cl. .............................. 346/108; 350/255; 358/128; 358/130
[51] Int. Cl.[2] ....................................... G01D 18/00
[58] Field of Search .......... 346/108, 137; 350/255; 178/6.6 R

[56] References Cited

UNITED STATES PATENTS

| | | | |
|---|---|---|---|
| 3,511,149 | 5/1970 | Blattner et al. | 350/255 X |
| 3,600,065 | 8/1971 | Law | 350/255 X |
| 3,614,456 | 10/1971 | Hamisch | 250/234 |
| 3,623,790 | 11/1971 | Buckstad | 350/46 |
| 3,704,657 | 12/1972 | Sliwkowski | 350/255 X |
| 3,825,323 | 7/1974 | Landwer | 350/255 |

*Primary Examiner*—Joseph W. Hartary
*Attorney, Agent, or Firm*—Fitzpatrick, Cella, Harper & Scinto

[57] ABSTRACT

An optical device includes a recording medium for recording and reproducing information by light beam, a generator of writing and reproducing light beam, a floating member provided at least one floating shoe which produces high air pressure at that surface thereof which faces to the recording medium at an extremely small distance thereof, an optical lens mounted upon the floating member for focusing the light beam upon the surface of the recording medium, a detector of the floating height of the floating member above the recording medium, and optical system controller for controlling in response to the output from the floating height detector in such a way that the point at which the light beam is focused by the optical lens is within a predetermined range relative to the surface of the recording medium.

14 Claims, 13 Drawing Figures

OPTICAL RECORDER HAVING FOCUS CONTROLLING MEANS

BACKGROUND OF THE INVENTION

1. Field of the Invention

The present invention relates to an optical device mounted upon a floating assembly, which is floated above an information recording medium, for optically recording the information upon the recording medium and reproducing the information recorded thereupon.

2. Description of the Prior Art

In magnetic recording and reproducing systems using magnetic disks, there has been known a floating magnetic head which floats at an extremely small distance above a rotating magnetic disk by the air flows produced along the surface thereof. An air bearing assembly for floating the magnetic head in the manner described above is generally known as the dynamic pressure type floating assembly, and finds a wide range of applications in magnetic disk devices used as peripheral equipment of electronic computers and in video disk devices for recording and reproducing the still TV images. The lift for floating the dynamic pressure type floating assembly and devices mounted thereupon is, in general, produced by a floating shoe or shoes. The surface of the floating shoe in opposed relation with the upper surface or recording surface of the disk is curved so that the lift is produced by the dynamic pressure of the air flowing between the shoe and the disk. The floating height, that is, the distance between the floating assembly and the upper surface of the disk, is varied in proportion to the relative speed between the floating shoe and the disk. The floating assembly of the type described is disclosed in "A Gas Film Lubrication Study", IMB Journal, July, 1959.

Recently there has been and demonstrated the optical disk device of the type in which the information is optically recorded upon a recording medium and is reproduced therefrom, and various studies and experiments have been made in order to develop a floating optical head capable of floating at a predetermined height above a rotating optical recording disk for an optical recording and reproducing system which is considerably heavier than the conventional magnetic heads. The underlying principle of the floating optical heads is substantially similar to that of the floating magnetic heads, but it is essentail for the floating optical heads that the recording surface must be maintained within the depth of field or focus of the optical head.

In general, the linear speed of the optical disk or disk-shaped optical recording medium, is faster at a point closer to its outer periphery than at a point closer to its inner periphery or center. As a result, the floating height of the floating assembly whose lift is dependent upon the velocity of the air flow, changes depending upon the position of the floating assembly along the radial line of the optical disk along which is displaced the floating assembly or optical head. Consequently, the relative distance between the optical system mounted upon the floating assembly and the surface of the disk changes depending upon the position of the floating head along the radial line of the disk. Therefore, when the optical system with a fixed focal distance is used, the light beam is not correctly focused upon the surface of the disk. That is, the sharp optical patterns are not recorded in writting while in reproduction the signal with a low S/N ratio is reproduced. The above problem also occurs when the rotational speed of the disk changes.

In general, there has been so far employed the method for exerting the force by a spring or the like to the floating assembly in the direction opposite to the direction in which the air flow strikes against the floating assembly in order to maintain the floating height of the floating assembly constant. In this case, the floating height is determined by the balance or equilibrium between the lift and the force exerted to the floating assembly toward the disk. Therefore, the downward force exerted to the assembly must be suitably changed depending upon the position of the floating assembly in order to compensate the variation in relative speed between the disk and the floating assembly. For this purpose, there has been demonstrated a method in which the position of the floating assembly above the disk along the radial line thereof is detected by a cam mechanism, and the downward force exerted to the floating assembly by a spring or the like is controlled by a mechanical linkage in response to the output of the position detecting cam mechanism so that the light beam may be always focused upon the surface of the disk.

However, in addition to the lift, the external force or the downward force is exerted to the assembly so that its position and operation become unstable. In some case, the floating assembly is too much inclined so that it collides with the surface of the disk. Furthermore, it is extremely difficult to determine where the downward force must be applied and the magnitude thereof. Moreover, the deflection of a spring which is used for exerting the downward force to the floating assembly is limited. Therefore, the force of the spring changes as its deflection changes when the floating assembly follows a relatively greater wrap or ondulation of the disk so that the floating height cannot be maintained constant. Thus, the controllable range of the floating assembly is limited when the spring is used. Same is true when the floating height changes due to the change in rotational speed of the disk.

SUMMARY OF THE INVENTION

One of the objects of the present invention is therefore to provide an improved optical device.

Another object of the present invention is to provide an optical device adapted for use with a device which floats above a recording medium for optical recording and reproduction.

A further object of the present invention is to provide an optical device capable of maintaining the compound focal plane of an optical system mounted upon a floating assembly which is lifted or floated by the air flows produced along the surface of a recording medium when the latter is transported, in coincidence with the recording surface of the recording medium regardless the transportation or rotational speed thereof.

A further object of the present invention is to provide an optical device simple in construction and highly reliable in operation and capable of maintaining the compound focal plane of an optical system mounted upon a floating assembly substantially in coincidence with the recording surface of the recording medium without any external force being exerted to the floating assembly which is lifted or floated by the air flows produced along the surface of the recording medium when the latter is transported or rotated, that is, the optical device being capable of holding the floating assembly in stable position.

A further object of the present invention is to provide an optical device capable of maintaining the focal plane of an optical system mounted upon a floating assembly which is lifted or floated by the air flows produced along the surface of a recording medium when the latter is transported or rotated, in coincidence with the recording surface of the recording medium regardless of the relative distance between the optical system and the recording medium.

A further object of the present invention is to provide an optical device capable of maintaining the relative distance between an optical system, one the one hand, mounted upon a floating assembly which is floated by the air flows produced along the surface of a recording medium when the latter is transported or rotated and the surface of the recording medium, on the other hand, regardless of the relative distance between the floating assembly and the surface of the recording medium.

A further object of the present invention is to provide an optical device best for use with an optical disk device of the type in which the information is recorded upon or reproduced from the recording surface of a rotating disk-shaped recording medium by an optical system mounted upon a floating assembly which is floated by the air flows produced along the surface of the recording medium when the latter is rotated.

A further object of the present invention is to provide an optical device best for use with an optical disk device of the type in which the information is recorded upon or reproduced from a disk-shaped recording medium by an optical system mounted upon a floating assembly which is floated by the air flow produced along the surface of the disk-shaped recording medium when the latter is rotated and which is displaced gradually radially inwardly of said disk-shaped recording medium in recording and reproduction so that the focal plane of the optical system may be maintained substantially in coincidence with the recording surface of the disk-shaped recording medium regardless of the positions of the floating assembly in the radial direction of the diskshaped recording medium.

A further object of the present invention is to provide an optical device best for use with an optical disk device of the type in which the information is recorded upon or reproduced from the surface of a disk-shaped recording medium by an optical system mounted upon a floating assembly which is floated by the air flows produced along the surface of the disk-shaped recording medium when the latter is rotated and which is displaced gradually along a spiral track radially inwardly of the disk-shaped recording medium in recording and reproduction so that the optical system may be controlled in response to the position of the floating assembly in the radial direction of the disk-shaped recording medium, thereby always maintaining the focal plane of the optical system substantially in coincidence with the recording surface of the disk-shaped recording medium.

The above and other objects, features and advantages of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DESCRIPTION OF THE PREFERRED EMBODIMENTS

Figure 1:
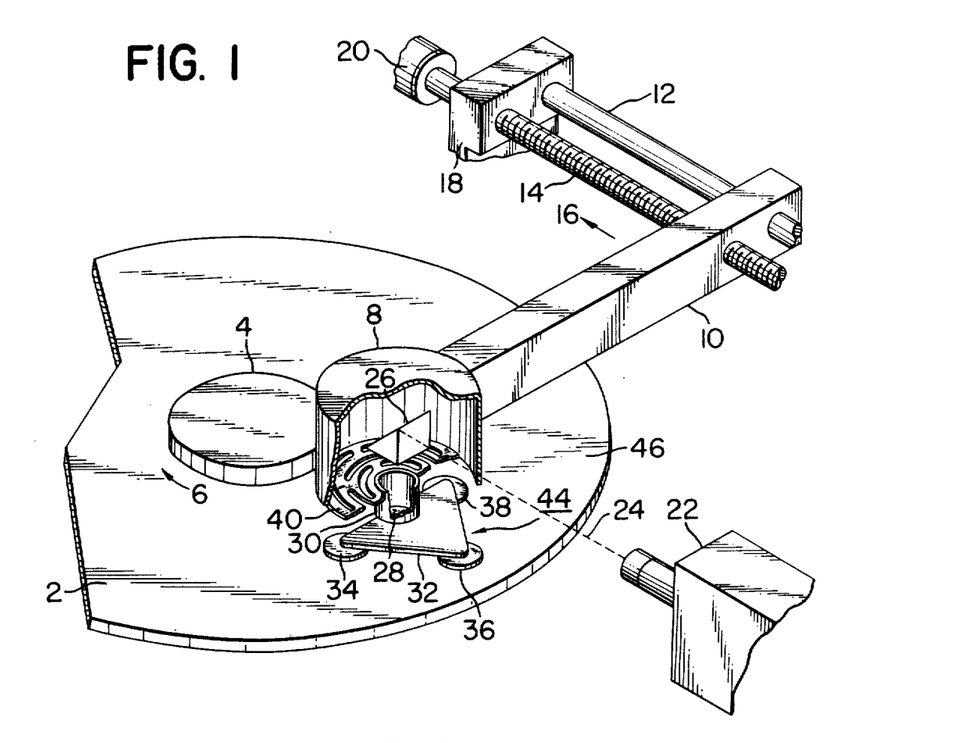
FIG. 1 is a perspective view, with parts broken away, of an optical disk device used for the explanation of the optical devices in accordance with the present invention.

FIG. 1 shows one example of an optical disk device used for the explanation of the optical devices in accordance with the present invention. Reference numeral 2 denotes an optical disk having a light sensitive member attached to one of the major surfaces thereof, the light sensitive member being adapted to be sensitive to the light in order to record the information; 4, a spindle for rotating the disk 2 in the direction indicated by the arrow 6; 8 an optical head housing therein an optical system for recording the information upon the disk 2; 10, an arm suspending the optical head; 12, a supporting rod for slidably supporting the arm 10; 14, a threaded rod or lead screw operatively coupled to a driving means 20 in such a way that when the lead screw 14 is rotated, the arm 10 may be moved in the direction indicated by the arrow 16 or in the direction opposed thereto; 18, a supporting member for the supporting rod 12 and the lead screw 14; 22, a beam output device for emitting the beam 24 which is modulated with the information signal; 26, a reflector such as a prism for re-directing the output beam 24 to the recording surface of the disk 2 at a right angle thereto; 28, an optical lens for focusing the beam 24 re-directed by the prism 26 at the recording surface of the optical disk 2; 30, a lens barrel for the lens 28; 32, a base upon which is supported the lens barrel 30; 34, 36 and 38, floating shoes attached to the undersurface of the base 32 in opposed relation with the recording surface of the optical disk 2 each shoe having at least one surface such as a curved surface which is not in parallel with the surface of the disk 2 and is positioned in opposed relation thereto so that lift may be produced by the air flows produced along the surface of the optical disk 2 when the latter is rotated in the direction indicated by the arrow 6; and 40, an elastic supporting member such as a gimbal spring for elastically securing to the optical head 8 a floating assembly 44 comprising the lens barrel 30 with the lens 28, and the base 32.

Figure 2:
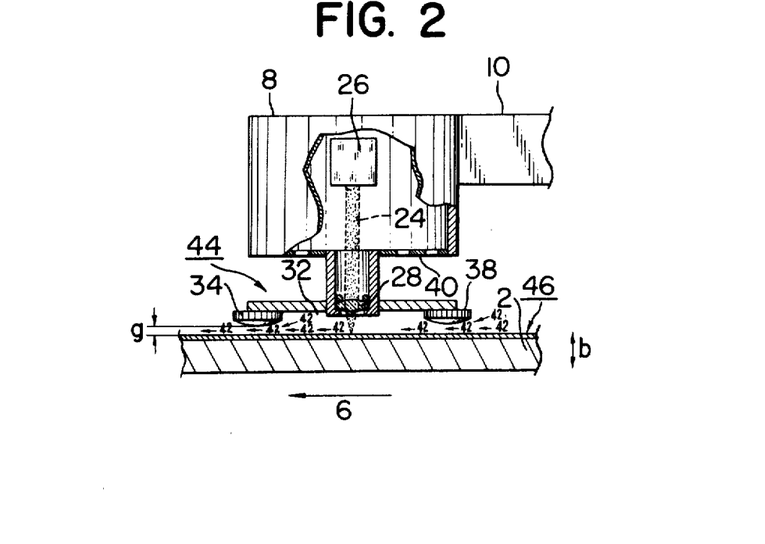
FIG. 2 is a fragmentary side view, with a part broken away, thereof illustrating mainly an optical head thereof.

When the disk 2 is rotated in the direction indicated by the arrow 6, the air flows or streams are produced as indicated by the arrow 42 in FIG. 2 because the air adjacent to the surface of the disk 2 is dragged. When the air flows between the curved surface of the shoe 34, 36 or 38 and the upper surface of the disk 2, it forms an air cushion so that the floating shoes 34, 36 and 38 are floated at a height g above the disk 2. Thus, the optical lens 28 is floatingly positioned above the disk 2. The curvature of the curved surfaces of the floating shoes 34, 36 and 38 and the elastic forces exerted to the floating assembly 44 from the elastic supporting member 40 must be so selected that the recording surface 46 of the disk 2 may be positioned within the depth of field of the lens 28.

The beam modulated with the information signal and emitted from the beam output device 22 is focused upon the recording surface 46 of the disk 2 through the optical system consisting of the reflector 26 and the lens 28, and is recorded thereupon. More particularly, the information is recorded upon a spiral track upon the recording surface 46 of the disk 2. For this purpose, as the disk 2 rotates, the optical lens 28 is gradually radially inwardly displaced. That is, the suspension arm 10 is displaced in the direction indicated by the arrow 16 as the lead screw 14 is rotated by its driving means 20 so that the lens 28 in the barrel 30 attached to the elastic supporting member 40 of the optical head 8 may be gradually radially inwardly displaced. The elastic supporting member 40 has a greater freedom for the displacement or inclination of the floating assembly 44 in the direction normal or almost normal to the recording surface 46 of the disk 2, but restricts the displacement of the floating assembly 44 in the direction parallel to the recording surface 46 of the disk 2, thereby preventing the floating assembly 44, which is floated by the floating shoes 34, 36 and 38, from being deflected by the air flows produced when the disk 2 is rotated. The elastic supporting member 40 also serves to transmit the force to the floating assembly 44 so that the latter may be radially inwardly displaced.

The conventional video disk devices use, in general, disks with a diameter of 20 to 30 cm., and the optical beam or signal 24, which is modulated with the television signals or the like, is focused along the spiral track upon the disk. That is, the light beam 24 such as the laser light beam, which is modulated by an optical modulator (not shown) depending upon the brightness, is focused as a spot pattern upon the recording surface 46 of the disk 2 so that the recording surface 46 is deformed by the optical and thermal energies of the light beam 24. The information signal is recorded in the form of the width of the deformation of the recording surface 46 and the length thereof in the direction of the spiral track. In order to correctly record the information signal with a high density as with the case of the television signal, the optical lens 28 is positioned in such a way that its focal plane may be substantially maintained coplanar with the recording surface 46 of the disk 2 in order to ensure the formation of a clear spot pattern upon the recording surface 46.

It is known that when the relative speed between the disk 2 and the floating shoes 34, 36 and 38 is constant, the floating assembly 44 may follow the vertical displacement of the recording surface 46 in the direction indicated by the doublepointed arrow b due to curvature or wrap of the disk 2 or the inclination of the spindle 4 so that floating height g may be kept constant. In other words, as far as the relative speed between the recording surface 46 of the disk 2 and the floating assembly 44 is kept constant, the focal plane of the beam 24 may be coplanar with the recording surface 46 so that a sharp signal spot pattern may be recorded upon or read out from the recording surface 46.

Figure 3:
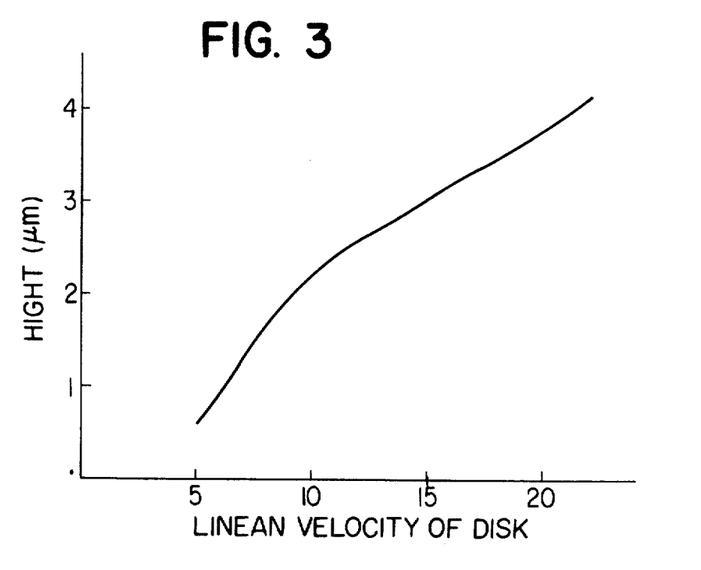
FIG. 3 is a diagram used for the explanation of the relationship between the linear speed of a disk and the floating height of a floating assembly.

The floating height g is dependent upon the rotational speed of the recording surface 46 of the disk 2. Therefore, when the rotational speed of the disk 2 varies, the floating height is fluctuated so that the light beam 24 may not be sharply focused upon the recording surface 46 of the disk 2. Therefore, the signal pattern recorded upon the recording surface 46 becomes vague or out of focus. The floating height g of the optical head 8 is also dependent upon the configurations and load of the floating head. According to the experiments conducted by the inventors, it was found out that when the rotational speed of the recording surface 46 changes from 20 m/sec. to 10 m/sec., the floating height g is decreased by 1.5 $\mu$ as shown in FIG. 3.

Figure 4:
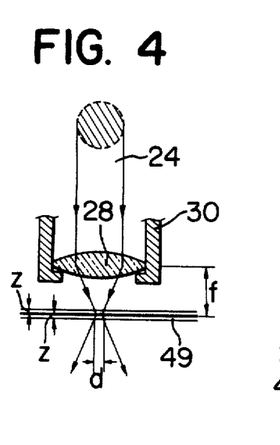
FIG. 4 is a longitudinal sectional view of an optical system in the optical disk device shown in FIG. 1 used for the explanation of the characteristics of the optical system.

It is assumed that the light beam 24 be circular in cross section and parallel. When the light beam 24 is incident upon the lens 28, it is focused as a spot with a finite area at a focal plane 49 spaced apart by the focal distance $f$ of the lens 28 due to the refraction. The diameter $d$ of the spot is given by $$d = 2.44 \, F\lambda \qquad (1)$$

where F: F number; and $\lambda$: wavelength of the beam 24. The length of the spot and the spacing between the spots are varied depending upon the signals. Therefore it is desired that the focal plane 48 of the lens 28 is made coincident with the recording surface 46 so that a sharp signal pattern (with no front wave aberration or with almost no front wave aberration) may be formed. However, it is known that even a spot image having the front aberration of 80/4 may be regarded as a sharp image. In other words, a sharp image may be obtained even when the focal plane 49 is not coincident with the recording surface 46. The range in which a sharp image is obtained is $$|z| \leq 2\lambda F^2 \qquad (2)$$

The above is well known as Rayleigh's depth of focus.

It follows, therefore, that when the change in floating height g is within the depth of field, a clear signal pattern may be recorded upon the recording surface 46. However, when the frequency of the signal to be recorded is high as with the case of the television signal (there being used the video disks having the television signals recorded thereupon), the diameter of the spot must be, in general, less than one micron. When the diameter of the spot is one micron, and when the wavelength of the light beam used is 0.45 $\mu$, then from Eq.(1), the F-number is 0.82, and from Eq.(2) the depth of field is 0.6 $\mu$. That is, when the floating distance or height is varied over 1.5 $\mu$, an obscure spot with the wave front aberration of higher than $\lambda/4$ is formed. Thus the beam 24 must be focused by the lens 28 within a very limited range.

FIRST EMBODIMENT

According to the first embodiment of the present invention, another optical system is inserted within the optical path of the light beam 24 closer to a light source in such a way that said another optical system may be displaced in the axial direction of the light beam 24 in response to the variation in floating height of the floating assembly 44 to vary the degree of convergence or divergence of the light beam incident upon the lens 28, thereby changing the converging distance of the light beam 24 by the lens 28. Thus, the converging point of the light beam 24 may be always made coincident with the recording surface 46 so that a sharp spot pattern may be formed upon the recording surface 46 even when the floating height $g$ varies. Thus, the high density signals may be recorded or played back.

Next referring to FIG. 5, the underlying principle of the first embodiment of an optical system in accordance with the present invention will be described. The parallel light beam 24 emitted from a laser light source (not shown) is condensed by a condenser lens 48 to form a spot light source 50 at a point spaced apart from the lens 48 by a distance equal to its focal length $f_{10}$. A lens 52 with a focal length $f_{11}$ is spaced apart from the spot light source 50 by $f_{11}$ so that the light from the spot light source 50 is refracted by the lens 52 into the parallel light beam 24A which is made incident upon the lens 28. The parallel light beam 24A is enlarged by $f_{11}/f_{10}$. The optical system consisting of the lenses 48 and 52 is generally called the focal optical system, and is also called the beam expander because the parallel beam 24 is expanded by $f_{11}/f_{10}$. The lens 28 is spaced apart from the lens 52 by D, and the parallel beam 24A is refracted by the lens 28 to be focused or converged as a spot light source 54 at a point spaced apart from the lens 28 by its focal length $f_{12}$. When the recording surface 46 of the disk is placed at the spot light source 54, a spot pattern is formed upon the recording surface 46. The recording surface 46 is rotated, and the parallel light beam 24 is modulated in intensity. Then, the length of the pattern recorded and the distance between the patterns are varied. The lens 28 is an element of the optical system mounted upon the floating assembly 44 which is floated by the floating shoes 34, 36, and 38, and the lens 28 is mounted in the lens barrel 30 placed upon the floating assembly 44 so that the lens 28 is floating above the recording surface 46.

Figure 5:
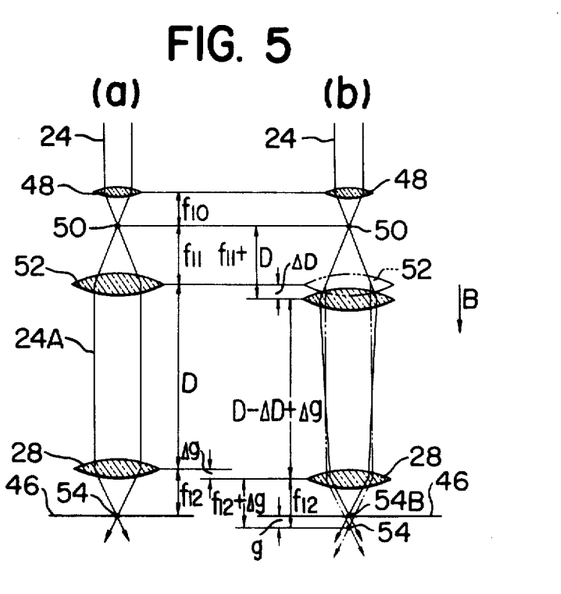
FIG. 5 is a view used for the explanation of the underlying principle of a first embodiment of an optical device in accordance with the present invention.

In the optical system shown in FIG. 5(a), the image of the spot light source 50 is formed at infinity by the lens 52. The spot light source image is again formed by the lens 28 as the spot light source 54 at the focal plane of the lens 28. The spot light source 54 is the image of the spot light source 50 so that the former will be referred as "a point image" hereinafter.

When the floating height $g$ of the floating assembly 44 is reduced, the point image 54 is formed below the recording surface 46 as indicated by the two-dot chain lines in FIG. 5(b) so that the light distribution upon the recording surface 46 is increased. That is, the point image 54 recorded upon the recording surface 46 is out of focus (in other words, the wave front aberration is greater).

When the lens 52 is displaced in the direction indicated by the arrow B to the position 52B as shown in FIG. 5(b) to distort the focal optical system or beam expander, the light beam emitted from the lens 52 and incident upon the lens 28 consists of converging spherical waves. Thus, the point image 54 may be focused upon the recording surface 46 (at the point indicated by 54B in FIG. 5(b). When the floating distance or height $g$ is reduced by $\Delta g$, the displacement $\Delta D$ over which the lens 52 must be displaced is given by the following well known formula:

$$\Delta D = \frac{x - \sqrt{X^2 - 4(\Delta g)^2 f_{11}^2}}{2\Delta g}$$

$$X = \Delta g \cdot - (\Delta g)^2 + f_{12}^2 - (f_{12} + f_{11})\Delta g \quad (3)$$

For instance when the variation in floating distance $g$ is 1.5 $\mu$ and D=400 mm, $f_{12}$=2.5 mm, and $f_{11}$=100 mm, the displacement $\Delta D$ of the lens 52 is 2.2 mm.

Figure 6:
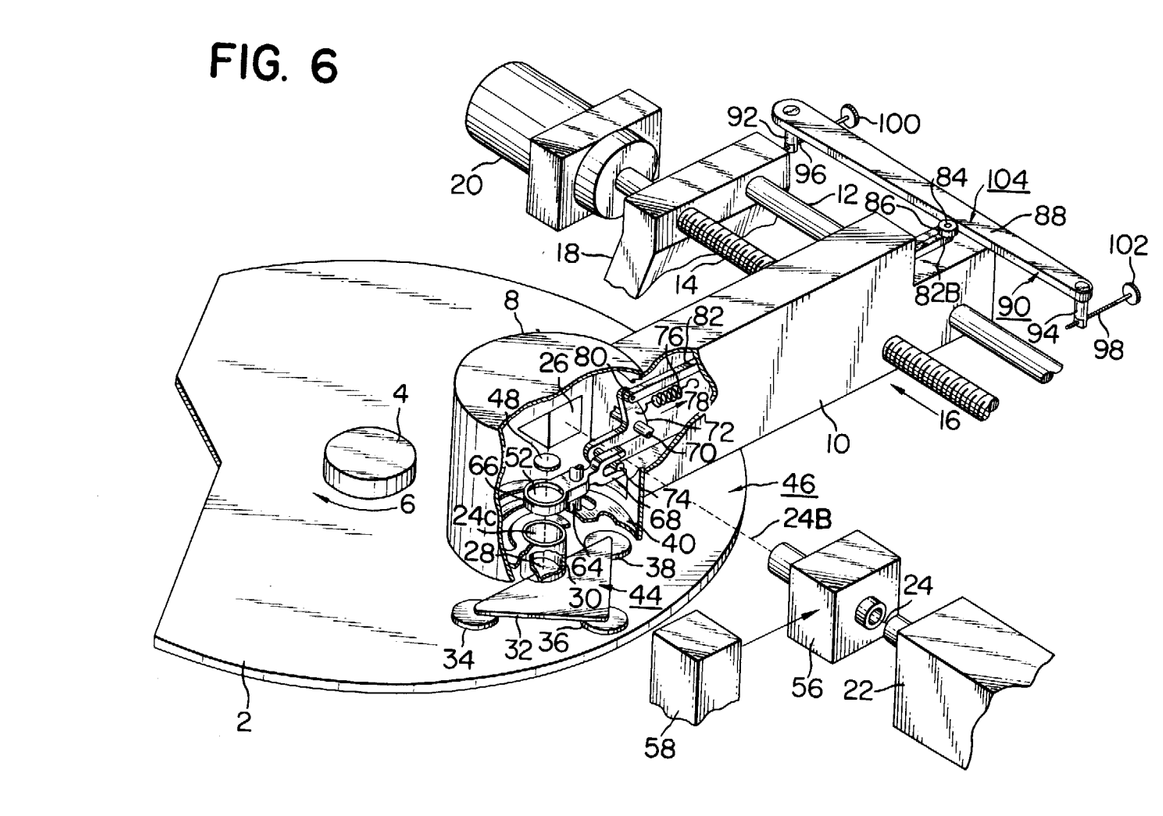
FIG. 6 is a perspective view with a part broken away of an optical disk device incorporating the first embodiment of the present invention.

FIG. 6 is a perspective view of a video disk device incorporating the optical device based upon the principle explained hereinbefore with reference to FIG. 5. The laser beam 24 emitted from a laser light source 22 is modulated in intensity by an optical modulator 56 depending upon the information signal applied thereto from a signal source 58. The intensity modulated beam 24B emitted from the optical modulator 56 is directed toward the optical head 8. The beam 24B is re-directed by the reflector 26 toward the recording surface 46 of the disk 2 through the beam expander consisting of the lenses 48 and 52 so that the expanded beam 24C is incident upon the lens 28 which is floated by the floating assembly 44. The light beam 24C is focused upon the recording surface 46 of the disk 2, which is rotating in the direction indicated by the arrow 6, so that the signal patterns representing the signals from the signal source 58 may be recorded upon the recording surface 46.

The lens 48 in the beam expander is securely held in position by suitable means (not shown) in the optical head 8 while the lens 52 is mounted in a lens holder 66 which in turn is supported by a guide rod 64 positioned within the optical head 8 normal to the recording surface 46 in such a way that the lens mount may be slidable in the axial direction of the guide rod 64. That is, the lens 52 may be movable in the axial direction of the light beam 24C. The bifurcated end or U-shaped arm 68 of the lens holder 66 engages a pin 74 extending from one end of an L-shaped lever 72 which is pivoted at 72 in the optical head 8 and is normally so biased by a biasing spring 76 as to rotate in the clockwise direction as indicated by the arrow 78. Therefore when the L-shaped lever 72 swings about the pivot 70, the force is transmitted through the pin 74 in engagement with the U-shaped arm 68 of the lens holder 66 so that the latter is vertically moved along the guide rod 64. Since the L-shaped lever 72 is biased in the clockwise direction as indicated by the arrow 78 by the spring 76, the lens holder 66 is normally biased upwardly away from the recording surface 46 of the disk 2.

The other end of the L-shaped lever 72 is operatively coupled by a pin 80 to one end of an adjusting lever 82. A roller 86 with a shaft 84 is rotatably attached to the other end 82B of the adjusting lever 82, and engages the control or cam surface 90 of a cotrol member 88 so that the displacement in the direction indicated by the arrow 78 of the lever 82 biased by the spring 76 may be limited. The control surface 90 of the control plate 88 is so positioned that it is gradually spaced apart from the optical head 8 from one end of the plate 88 corresponding to the center or the inner periphery of the disk 2 toward the other end corresponding to the outer periphery thereof. The inclination of the control surface may be adjusted by knobs 100 and 102 having threaded rods 96 and 98 made into threadable engagement with pins 92 and 94 extended downwardly from the ends of the control plate 88, respectively. The threaded rods 96 and 98 of the control knobs 100 and 102 are so supported by suitable means (not shown) that the displacement in the axial direction may be prevented.

When the driving device 20 is driven, the lead screw 14 displaces the optical head 8 in the direction indicated by the arrow 16. As the optical head 8 is displaced radially inwardly of the disk 2, the other end 82B of the control plate 88 is pushed in the direction indicated by the arrow 104 by the control surface 90. That is, the adjusting lever 82 is displaced against the spring 76 in the direction indicated by the arrow 104 depending upon the position of the optical head 8 in the radial direction of the disk 2. Therefore, as the optical head 8 approaches toward the center of the disk, the L-shaped lever 72 is rotated in the counter-clockwise direction so that the lens holder 66 is displaced along the guide rod 64 toward the recording surface 46 of the disk 2.

The linear speed of the recording surface 46 immediately below the floating assembly 44 is given by $$V = 2\pi \cdot R \cdot n \tag{4}$$

where $n$: rotation frequency of disk 2; and
  R: distance from the center of rotation of the disk 2 to the floating assembly 44. It is seen that the linear speed V changes with the distance R so that the floating height g also changes.

In the first embodiment shown in FIG. 6, the lens 52 is displaced depending upon the change in floating height g as explained with reference to FIG. 5 so that a sharp signal pattern may be always correctly focused by the lens 28 upon the recording surface 46 of the disk 2.

The displacement and the displacement pattern of the lens 52 are dependent upon the diameter and rotational speed of the disk 2, the floating characteristic of the floating shoes 34, 36, and 38, the focal lengths of the lenses 48, 52, and 28, and the relative positions thereof. Therefore, in order to displace the lens 52 over a desired distance by a desired displacement pattern, the configuration of the control surface 90 of the control plate 88 must be suitable selected, and the inclination of the control surface 90 must be also suitably adjusted by the adjusting knobs 100 and 102.

However, the disk 2 will not rotate in a horizontal plane when its surface is rough or when the spindle 4 is not correctly attached to the disk. As a result, the floating assembly 44 is caused to vertically vibrate so that the distance between the lenses 28 and 52 varied, resulting in the displacement of the point image. The amplitude of the vertical vibrations of the disk 2 may be easily limited within a few hundredths microns; that is, within the depth of field of the lens 28. Therefore the small displacement of the point image due to the vertical vibrations of the floating assembly 44 may be negligible.

As described hereinbefore, even when the floating distance g varied as the optical head 8 approaches toward the center of the disk 2, the position of the point image formed by the lens 28 may be varied so that the sharp and clear signal patterns may be formed over the whole recording surface 46 of the disk 2.

SECOND EMBODIMENT

Figure 7:
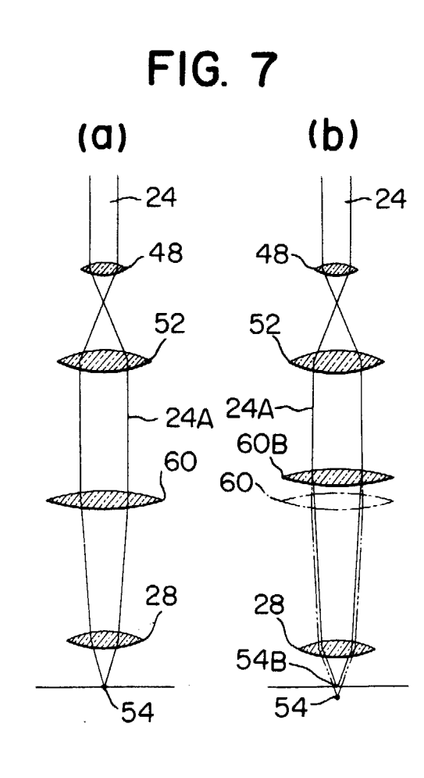
FIG. 7 is a view used for the explanation of the underlying principle of a second embodiment of the present invention.

Next the underlying principle of the second embodiment of the present invention will be described with reference to FIG. 7. In the second embodiment, optical elements interposed between the lenses 28 and 48 are displaced so that the point image 54, which is formed by the lens 28, may be displaced in order to countermeasure the variation in floating height of the floating assembly 44. In FIG. 7, only one optical element or lens 60 with a focal length $f_{13}$ is shown as being interposed between the lenses 48 and 28 for the sake of simplicity of explanation, and is spaced apart from the lens 28 by a distace H.

In the combination of the lenses 60 and 28, the point image 54 may be displaced as the lens 60 is displaced because the compound focal length of these two lenses 60 and 28 varies with the distance therebetween. In order to displace the point image 54 the variation $\Delta g$ in floating distance g, the lens 60 must be displaced over a distance given by the following well knwon formula:

$$\Delta H = \frac{g(f_{12}^2 + f_{13}^2 + 2f_{13}f_{12} - 2f_{12}H - 2f_{13}H + H^2)}{f_{12}^2 + (f_{12} + f_{13} - H)\Delta g} \tag{5}$$

When the parallel light beam 24A is incident upon the lens 60, the point image 54 is formed at the compound focal plane as shown in FIG. 7(a), but when the lens 60 is displaced over $\Delta H$ to the position 60B indicated in FIG. 7(b), the point image 54 is displaced to the position 54B. That is, when the lens 60 is displace by $\Delta H$ when the lens 28 is deviated by $\Delta g$ relative to the recording surface 46 of the disk 2, the point image 54 may be always produced upon the recording surface 46 of the disk. For instance, when the floating height deviation $\Delta g$ of the floating assembly 44 is $1.5\mu$, the focal length $f_{12}$ of lens 28 is 2.5mm, the focal length $f_{13}$ of the lens 60 is 544mm, and the distance H between the lenses 60 and 28 is 400mm, the lens 60 must be displaced approximately by 5mm, backwardly or upwardly of the lens 28.

When the lens 60 is mounted upon the main body when the displacement between the lenses 60 and 28 is compensated by the displacement $\Delta H$ of the optical head 8 which is displaced radially inwardly of the disk, and if the focal lengths of the lenses 28 and 60 and the distance therebetween are suitably selected, means for displacing the lens 60 may be eliminated.

Figure 8:
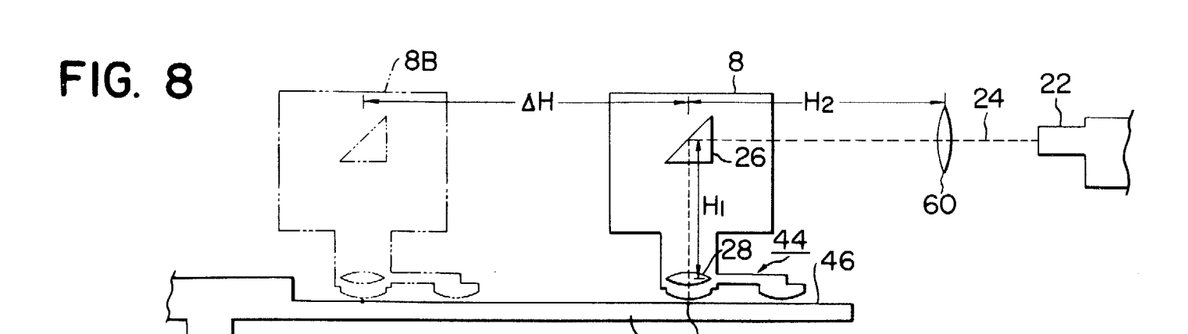
FIG. 8 is a diagrammatic view of an optical disk device incorporating the second embodiment of the present invention.

The videodisk device provided with the optical device based upon the underlying principle of the second embodiment of the present invention is shown in FIG. 8. The laser beam 24 emitted from the light source 22 including the beam expander is transmitted through the lens 60, which is mounted upon the main body, and is redirected by the reflector 26 toward the lens 28. The distance between the lenses 60 and 28 is H ($=H_1+H_2$) but when the optical head 8B is moved to the position 8B, the distance between the lenses 60 and 28 become H +ΔH, and the floating height between the lens 28 and the recording surface 46 of the disk 2 is reduced by Δg. Since the converging distance of the laser beam 24 is reduced by Δg when the distance between the lenses 60 and 28 is H +ΔH, the sharp point image 54 may be produced upon the recording surface 46 even when the floating height of the assembly 44 is decreased as the optical head 8 is displaced radially inwardly of the disk 2. To satisfy the above conditions, the focal lengths $f_{12}$ and $f_{13}$ which satisfy Eq.(5) must be selected. For instance, when the displacement of the optical head 8 or the distance between the lenses 60 and 28 is 400mm, with H = 400mm, $f_{12}$ = 2.5mm, and the deviation Δg of the floating assembly 44 = 1.5μ, then the lens 60 with the focal length $f_{13}$ = approximately - 393.5mm must be used. In this case, the lens 60 is a diverging lens.

THIRD EMBODIMENT

Figure 9:
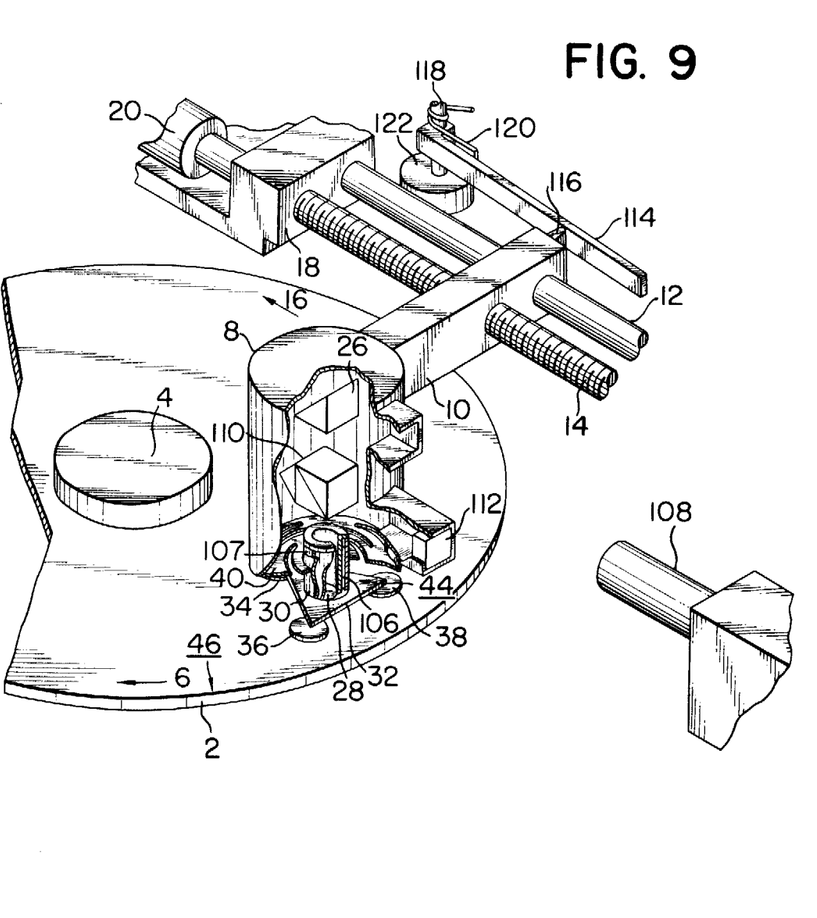
FIG. 9 is a perspective view of an optical disk device incorporating therein a third embodiment of an optical device in accordance with the present invention.
Figure 10:
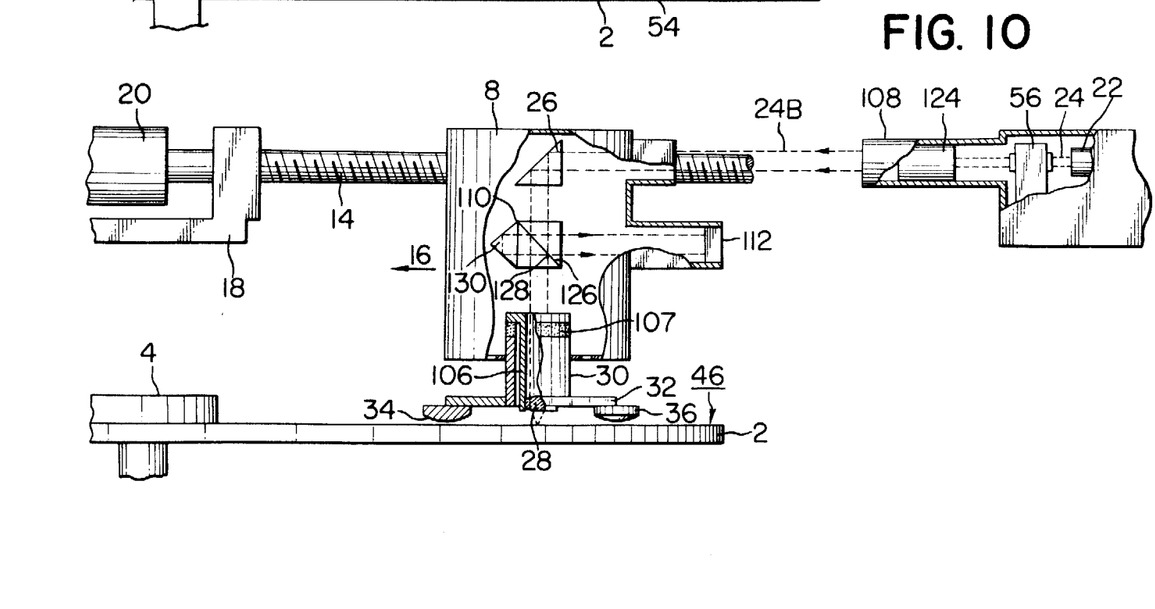
FIG. 10 is a fragmentary side view thereof.

FIG. 9 is a perspective view, with some parts broken away, of the video disk device incorporating the third embodiment of the present invention; and FIG. 10 is a fragmentary side view thereof. The video disk device shown in FIG. 9 is substantially similar in construction to the video disk device shown in FIG. 1 but it further includes a movable lens barrel 106 in which is mounted the lens 28 and which is coaxially disposed within the lens barrel 30 for movement; position adjusting means 107 such as a piezoelectric element for controlling the relative position of the lens barrel 106 relative to the lens barrel 30; light beam emitting means 108 for emitting the light beam 24B which is modulated with the information signal; light beam splitting means 110 which splits the light beam 24B from the reflector 26 into a first light beam incident upon the lens 28 and a second light beam and for redirecting the light beam reflected back from the recording surface toward a plane at which it is interferred with said second light beam; an interference screen 112 at which the interference fringes of the two light beams redirected from the light beam splitting means 110 are produced; a position detecting arm 114 which swings about its pivot 118 as the arm 10 is displaced in the direction indicated by the arrow 16 or in the opposite direction and is in slidable contact with a sliding member 116 attached to one end of the arm 10; a biasing spring 120 for biasing the position detecting arm 114 into contact with the sliding member 116; position detecting means 122 for detecting the position of the optical head 8 in the radial direction of the disk from the angle of swing of the position detecting arm 114, thereby generating the signal representing the position of the optical head 8; the light source 22 for emitting the laser beam 24; the optical modulator 56 for modulating the light beam with the variable-intensity information signal; and a beam expander 24 for expanding the light beam emitted from the optical modulator 56.

Next, the mode of operation with the video device with the above construction will be described. As described hereinbefore, when the disk 2 is rotated in the direction indicated by the arrow 6, the floating shoes 34, 36 and 38 are lifted by the air flows produced between them and the surface of the disk 2. As shown in FIG. 3, the floating height of these floating shoes 34, 36 and 38 is approximately in proportion to the linear speed of the recording surface 46 of the disk. As the floating shoes 34, 36 and 38 are lifted, the lens barrels 30 and 106 and hence the lens 28 are floated above the recording surface 46 of the disk 2. The distance between the lens 28 and the recording surface 46 is dependent upon the floating height of the floating shoes 34, 36 and 38. That is, as far as the rotational speed of the disk 2 is constant and, therefore, the linear speed of the recording surface 46 thereof relative to the floating shoes 34, 36 and 38 is constant, the floating height is constant. Therefore, the distance between the optical lens 28 and the recording surface 46 may be maintained constant.

The light beam 24B emitted from the light beam emitting means 108 is redirected by the reflector 26 toward the lens 28. The light beam splitting means 110 splits the light beam from the reflector 26 into the light beam directed toward the lens 28 and the light beam directed toward the interference screen 112. The light beam incident upon the lens 28 is refracted thereby to be focused at the focal plane thereof. In order that the light beam may record the clear information pattern upon the recording surface 46, the floating height of the floating shoes 34, 36 and 38 must be so adjusted that the focal plane of the lens 28 may be made coincident with the recording surface 46. A part of the light beam focused upon the recording surface 46 is reflected by it toward the lens 28, and is redirected again by the reflecting surface 128 and 130 of the light beam splitting means 110 toward the interference screen 112. Therefore, the interference fringes between the light beam redirected by the reflecting surface 128 and the light beam reflected from the recording surface and redirected by the reflecting surfaces 128 and 130 are produced on the interference screen 112. The interference fringe pattern changes as the distance between the lens 28 and the recording surface 46 changes, but as far as the distance between them is constant, the same fringe pattern is produced. Thus, it is easily detected whether or not the focal plane of the lens 28 is coincident with the recording surface 46 of the disk 2.

The lead screw 14, which is driven at a constant rotational speed by the driving means 20, drives the suspension arm 10 and hence the optical head 8 in the direction indicated by the arrow 16. In this case, the lens 28 and the floating shoes 34, 36 and 38, which are attached through the elastic supporting member 40 to the optical head 8, are also displaced in the direction indicated by the arrow 16; that is, radially inwardly of the disk 2. As a result, the spiral recording track is produced upon the recording surface 46 of the disk 2.

The linear speed of the recording surface 46 of the disk is slower at the inner periphery than at the outer periphery. As a result, the floating height of the floating shoes 34, 36 and 38 changes as they approach toward the center of the disk 2. For instance, assume that the rotational speed of the disk 2 be 1,800 rpm. and the optical head 8 be displaced from the position 100mm away from the center of the disk 2 toward the position 50mm away from the center. Then, the linear speed of the recording surface 46 changes from 19m/sec. to 9.5m/sec. According to the experiments conducted by the inventors, it was found out that the floating height of the floating shoes 34, 36 and 38 changes from 3.6μm to 2.2μm with the total deviation of 1.4μm. In the optical recording, the depth of field or focus of the lens 28 is extremely limited and is of the order of a few tenths microns. In general, the deviation in floating height of the floating shoes 34, 36 and 38 is considerably greater than the depth of field of the lens 28. Therefore when the distance between the lens 28 and the recording surface 48 is maintained only with the aid of the floating shoes 34, 36 and 38, the focal plane of the lens 28 cannot be maintained in coplanar relation with the recording surface 46 so that the out-of-focus signal pattern would be produced. Furthermore, the floating height changes when the rotational speed of the spindle 4 changes.

To overcome the above problem, according to the third embodiment of the present invention, the optical axis of the lens 28 relative to the floating shoes 34, 36 and 38 is varied in response to the output signal from the position control means 107 interposed between the barrel 30 and the movable barrel 106 when the floating height changes, whereby the distance between the lens 28 and the recording surface 46 may be always maintained constant. Thus, the focal plane of the lens 28 may be made coincident with the recording surface 46 so that the sharp and high S/N signal pattern may be produced.

Figure 11:
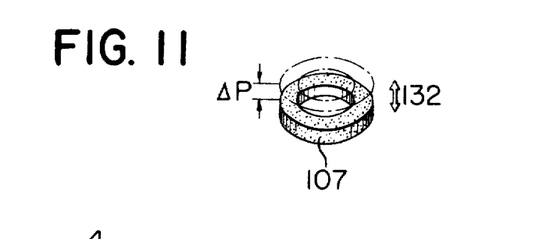
FIG. 11 is a perspective view of position control means used in the third embodiment.

In the third embodiment of the present invention a piezoelectric element shown in FIG. 11 is used as the position control means 107. The deformation P of the element in the direction of its thickness is considerably less when the voltage is impressed as shown in FIG. 11, but is sufficient enough to compensate the variation in floating height of the floating shoes 34, 36 and 38 of the order of a few microns.

According to the third embodiment of the present invention, the manual compensation or control of the lens 28 may be effected in order to compensate the variation in floating height due to the displacement of the optical head 8 and/or the variation in rotational speed of the spindle 4. When the focal plane of the lens 28 is coincident with the recording surface 46 of the disk, the interference fringes between the plane waves are produced upon the interference screen 112. That is, the so-called one color pattern with a dark or bright fringe is produced. However, when the focal plane of the lens 28 is not coincident with the recording surface 46, the circular fringes due to the interference between the plane and spherical waves are produced. Thus, one may easily detect the relative position between the focal plane of the lens 28 and the recording surface 46 from the interference fringes observed on the screen 112, and, may impress a suitable voltage across the element 107, thereby bringing the focal plane of the lens 28 into coplanar relationship with the recording surface 46. The voltage impressed across the element 107 may be adjusted, for instance, by a variable resistor.

In order to compensate the variation in floating height due to the displacement of the optical head 8 in the radial inward direction of the disk 2, the position detecting means 122 generates the signal representative of the variation in floating distance of the optical head at a given point in the radial inward direction of the disk 2. This signal is generated based upon a set of previously measured data or upon calculation from the corelationship between the position of the optical head 8 and the angle of swing of the position detecting arm 114.

In order to compensate the variation in floating height due to the variation in rotational speed of the spindle 4, the position of the lens 28 relative to the floating shoes 34, 36 and 38 is changed as will be described in detail hereinafter with reference to FIG. 12.

Figure 12:
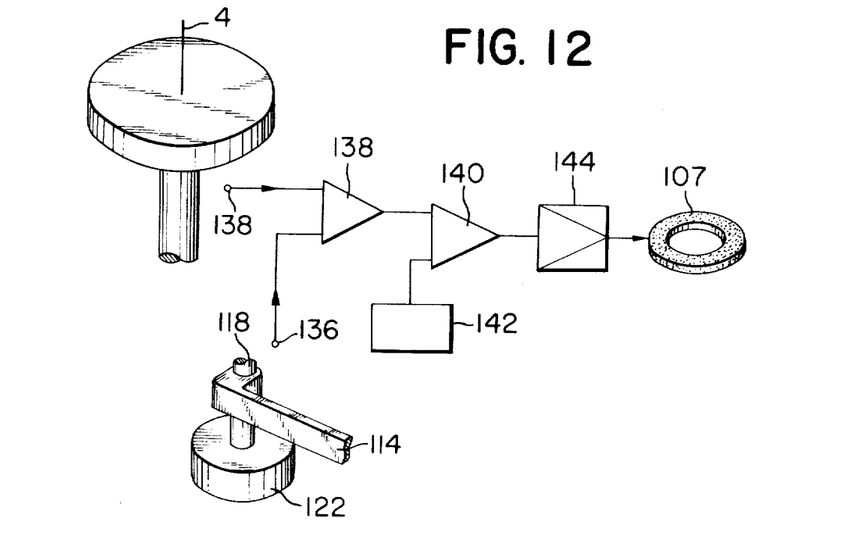
FIG. 12 is a block diagram of a control circuit of the position control means shown in FIG. 11.

FIG. 12 is a block diagram of a control circuit associated with the position control means 107 for controlling the position of the lens 28 relative to the floating shoes 34, 36 and 38 depending upon the displacement of the optical head 8 relative to the disk 2 and upon the rotational speed of the spindle 4. Reference numeral 134 denotes a terminal to which is applied the input signal representative of the rotational speed of the spindle 4; 136, an input terminal to which is applied the signal from the position detecting means 122 representing the position of the optical head 8 relative to the disk 2; 138, an operational amplifier for deriving the floating height of the floating shoes 34, 36 and 38 based upon the linear speed of the recording surface 46 relative to the optical head 8 at a given position in response to the input signals applied to the input terminals 134 and 136; 140, a subtraction circuit for subtracting the output from the operational amplifier 138 from the output of a variable DC voltage source 142.

The higher the floating height the lower the output from the subtraction circuit becomes while the lower the floating height the greater the output becomes. The output from the circuit 140 is applied through an amplifier 144 to the position control means 107 so that the movalbe barrel 106 carrying the optical lens 28 is inclined in the direction opposite to the direction of rotation of the disk 2, thereby maintaining the focal plane of the lens 28 coplanar with the recording surface 48. The output of the variable DC voltage source and the characteristics of the amplifier 144 are suitably selected so that the optimum signal may be applied to the position control means 107. As described hereinbefore, one may observe the interference fringes on the interference screen 112 so as to detect whether or not the focal plane of the lens 28 is coincident with the recording surface 46.

As described hereinbefore, according to the present invention, the focal plane of the lens 28 may be always maintained in coincidence with the recording surface 46 of the disk 2 regardless of the variation in floating height of the floating shoes 34, 36 and 38 due to the variation in linear speed of the recording surface 46. Furthermore, one may control the position control means 107 while observing the interference fringes on the screen 112 so that the focal plane of the lens 28 may be always made coplanar with the recording surface 46.

Figure 13:
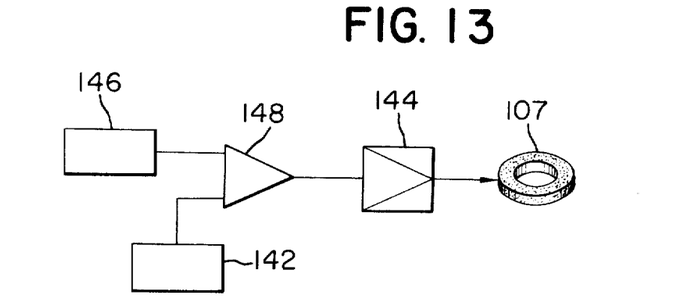
FIG. 13 is a block diagram of another control circuit of the position control means shown in FIG. 11.

For this purpose, the control circuit shown in FIG. 13 is used. A light intensity detector 146 is adapted to generate the signal representative of the brightness of the interference screen 112. When the position of the optical lens 28 at which the brightness of the interference pattern is decreased as the relative distance between the optical lens 28 and the recording surface 46 is decreased, the signal representative of the relative distance between the lens 28 and the recording surface 46 is generated. Reference numeral 148 represents a differential amplifier to which are applied to outputs from the variable DC voltage source 142 and the brightness detector 146. The output voltage from the variable DC voltage source 142 is set to equal to the output voltage from the brightness detector 146 when the focal plane of the lens 28 is coincident with the recording surface 46 so that the differential amplifier 148 gives the output signal when the focal plane of the lens 28 is deviated from the recording surface 46. The output from the differential amplifier 148 is applied through the amplifier 144 to the position control means 107 so that the movable lens barrel 107 is driven until the focal plane of the lens 28 is made again in coincidence with the recording surface 46.

As described above, according to the present invention, the focal plane of the lens 28 may be always kept in coplanar relationship with the recording surface 46 regardless the position of the optical head 8 relative to the disk 2 and the rotational speed of the disk 2.

That is, the present invention provides the nobel optical devices with the constructions described in the above embodiments which device is capable of always maintaining in coincidence with the recording surface of a recording medium the focal plane of the optical lens mounted upon the floating assembly which floats above the recording medium by the air flows produced when the recording medium is rotated even when the floating height is varied due to the change in rotational speed of the recording medium.

So far for the sake of simplicity in explanation, the optical devices in accordance with the present invention have been described as being applied to the optical video disk devices, but it is to be understood that the present invention may be also applied to the optical devices of the type for reproducing the signal patterns recorded upon the recording medium by focusing the light beam upon the recording medium and demodulating the light beam transmitted through or reflected by the recording medium. Furthermore, in addition to the mechanical linkage for controlling the position of the optical lens, any suitable means such as electromagnets, small-sized servomotors, bimetals, or the like which may be obvious to those skilled in the art from the disclosure of preferred embodiments of the present invention may be used even though their particular applications are not disclosed in this specification. It is also to be understood that any suitable means such as sliding variable resistors, optical detecting means, electrostatic detecting means, induction detecting means, and so on may be used as the means for detecting the position of the optical head relative to the disk. In the above embodiments of the present invention, the optical system for writing and recording the information has been described as being mounted upon the so-called dynamic pressure type floating assembly provided with the floating shoes which are lifted by the air flows produced due to the viscous friction when the disk is rotated, but it is to be understood that the present invention is not limited thereto. The present invention may be also applied to the optical recording and reproducing system mounted upon the so-called static pressure type floating assembly provided with the floating shoes of the type which are lifted by the air cushion formed between them and the recording surface of the disk when the compressed air is injected thereto. In this case, the floating distance or height is varied not only by the variation in relative speed between the floating assembly and the recording medium or disk but also by the variation in pressure of the discharged compressed air, but the control of the optical lens and its associated optical system or systems may be effected in a manner substantially similar to those described in the above preferred embodiments. According to the present invention, opposed to the conventional method for focusing the light beam upon the recording surface by controlling the pressure of the compressed air ejected, the optical lens and its associated optical system or systems are controlled very effectively.

We claim:

1. An optical device comprising:
a recording medium for recording and reproducing light beam signals;
means for producing the light beam for information recording and reproducing;
a floating member provided with at least one floating shoe having a surface adapted to face said recording medium, said floating shoe being floatable above said recording medium with a clearance determined by high pressure air produced adjacent said surface of the shoe;
an optical system for focusing the light beam on a surface of said recording medium, at least a part of said optical system being carried on said floating member and said optical system having at least three lenses, an optical path length between one of said at least three lenses and said recording medium being variable;
means for detecting the positional relationship of said floating member above said recording medium;
means for controlling, in accordance with said detecting means, said optical system to keep the focus of the light beam within a predetermined range relative to the surface of said recording medium, said controlling means changing the relative position of at least one of said at least three lenses relative to the surface of said recording medium.

2. A device according to claim 1 further comprising means for moving said at least one lens which is positioned across the optical path and between a stationary lens fixed on said floating member and said beam generating means.

3. A device according to claim 1, wherein said positional detecting means includes,
beam splitting means disposed across an optical path of the light beam to split the light beam into a first light beam and a second light beam, the first light beam being focused by said optical system on the surface of said recording medium;
light redirecting means for redirecting either the second light beam or the light beam reflected from said surface of said recording medium after having beam focused thereon in such a direction that the second light beam may interfere with the reflected light beam; and
means disposed in the direction for intercepting the light beam directed by said redirecting means, whereby the interference fringes between the second light beam and the reflected light beam may be produced; and further comprising,
moving means including a piezoelectric element disposed between said optical system and said floating member for moving said part of said optical system.

4. An optical device comprising:
a recording medium for recording and reproducing light beam signals;
means for producing a light beam for information recording and reproducing;
means for moving said recording medium;
a floating member provided with at least one floating shoe having at least one surface which is adapted to face a surface of said recording medium, said shoe surface and said recording medium surfaces being non-parallel, said floating shoe being floatable above said recording medium with a clearance by a high pressure produced adjacent said surface of the shoe by air flow due to movement of said recording medium;
an optical system for focusing the light beam on a surface of said recording medium; at least a part of said optical system being carried on said floating member and said optical system having at least three lenses, the optical path length between one of said at least three lenses and said recording medium being variable;

means for detecting the positional relationship of said floating member above said recording medium; and means for controlling, in accordance with said detecting means, said optical system to keep the focus of the light beam within a predetermined range relative to the surface of said recording medium, said controlling means changing the relative position, measured along the optical path of said optical system, of at least one of said at least three lenses relative to the surface of said recording medium.

5. A device according to claim 4, wherein said floating height detecting means detects the floating height by detecting the relative speed between said recording medium and said floating member.

6. A device according to claim 5, further comprising means for moving said at least one lens, which is positioned across the optical path, between a stationary lens fixed on said floating member and said beam generating means.

7. An optical device comprising:
a disk-like recording medium for recording and reproducing light beam signals;
means for producing the light beam for write-in and readout;
means for rotating said recording medium;
a floating member provided with at least one floating shoe having at least one surface which is adapted to face a major surface of said recording medium and being non-parallel therewith, said floating shoe being floatable above said recording medium with a clearance determined by a high pressure produced adjacent said surface of the shoe by air flow due to the movement of said recording medium;
an optical system for focusing the light beam on a surface of said recording medium, at least a part of said optical system being carried on said floating member and said optical system having at least three lenses, the optical path length between one of said at least three lenses and said recording medium being variable;
means for moving said floating member in a direction parallel to a radial direction of said disk-like recording medium;
means for detecting the positional relationship of said floating member above said recording medium; and
means for controlling, in accordance with said detecting means, said optical system to keep the focus of the light beam within a predetermined range relative to the surface of said recording medium, said controlling means changing the relative position, measured along the optical path of said optical system, of at least one of said at least three lenses relative to the surface of said recording medium.

8. A device according to claim 7, wherein said detecting means indirectly detects the floating height by detecting the position of said floating member in the radial direction of said disk-like recording member.

9. A device according to claim 8, further comprising means for moving said at least one lens, which is positioned across the optical path, between a stationary lens fixed on said floating member and said beam generating means.

10. A device according to claim 7, wherein said floating height detecting means includes a guiding member which is disposed unparallel with respect to a radius of said recording medium along which said floating member moves, and wherein said controlling means includes a linking mechanism for moving a lens disposed between a lens carried on said floating member and said beam producing means, in accordance with the position of said floating member in a radial direction of said recording medium, during the radial movement of said floating member controlled by said guiding member.

11. A device according to claim 10, wherein said guiding member has a configuration in accordance with a predetermined functional relationship with respect to the radius.

12. An optical device comprising:
a disk-like recording medium for recording and reproducing signals in accordance with a light beam;
means for rotating said recording medium;
a floating member provided with at least one floating shoe having at least one surface which is adapted to face said recording medium unparallel therewith, said floating shoe being floatable above said recording medium with a clearance by a high pressure produced adjacent said surface of the shoe by air flow due to movement of said recording medium;
means for moving said floating member in a direction parallel with the radial direction of said recording member;
means for producing the light beam for write-in and read-out, the beam being emitted in a direction parallel with the movement of said floating member;
means for directing the beam produced from said beam producing means to said recording medium;
an optical system for focusing the beam on said recording medium; said system being disposed on said floating member; and
a compensating lens which is stationary with respect to said beam producing means and disposed between said beam generating means and said directing means, said lens compensating for the variation in the floating height of the floating member by changing the optical path length between said compensating lens and said recording medium, which is caused by the radial movement of said floating member.

13. An optical device comprising;
a. a disk-shaped recording means having at least one major surface thereof attached with a photosensitive member capable of recording thereupon the information in response to the light beam focused thereupon;
b. means for producing the recording coherent light beam which is modulated with the information signal to be recorded upon said disk-shaped recording means;
c. means for rotating said disk-shaped recording means about its axis;
d. a floating member provided with at least one floating shoe having at least one surface which is not in parallel with the opposing surface of said disk-shaped recordng means for producing the high air pressure directed toward said opposing surface from the air flows produced along said opposing surface when said disk-shaped recording means is rotated, thereby causing said floating member to float above said disk-shaped recording means;

e. light redirecting means for redirecting said light beam perpendicular to the surface of said (photosensitive member on said) disk-shaped recording means;

f. an optical lens mounted upon said floating member for focusing or converging said redirected light beam upon the surface of said disk-shaped recording means;

g. means for displacing said floating member radially inwardly of said disk-shaped recording means;

h. an adjusting member provided with a guide so disposed with respect to the radial line of said disk-shaped recording means, along which is displaced said floating member, as to represent a predetermined functional relationship with respect to the position of said floating member, thereby detecting the position thereof;

i. a movable optical lens system interposed in the optical axis between said optical lens mounted upon said floating member and said light beam producing means so as to be movable along said optical axis; and j. a linkage which is controlled by said guide of said adjusting member when said floating member is displaced along said radial line of said disk-shaped recording means, thereby displacing said movable lens system along its optical axis in response to the position of said floating member along said radial line of said disk-shaped recording means.

14. An optical device comprising a. a disk-shaped recording means having at least one major surface thereof attached with a photosensitive member capable of recording thereupon the information in response to the light beam focused thereupon;

b. means for producing the recording coherent light beam which is modulated with the information to be recorded upon said disk-shaped recording means;

c. means for rotating said disk-shaped recording means about its axis;

d. a floating member provided with at least one floating shoe having at least one surface which is not in parallel with the opposing surface of said disk-shaped recording means for producing the high air pressure directed toward said opposing surface from the air flows produced along said opposing surface when said disk-shaped recording means is rotated, thereby causing said floating member to float above said disk-shaped recording means;

e. light redirecting means for redirecting said light beam perpendicular to the surface of said disk-shaped recording means;

f. an optical lens mounted upon said floating member for focusing or converging said redirected light beam upon the surface of said disk-shaped recording means;

g. an annular piezoelectric element upon which is mounted said optical lens and which is interposed between said optical lens and said floating member so that when the voltage is impressed across said piezoelectric element in response to the change in said floating height, said elements is distorted to displace said optical lens along the optical axis thereof, thereby changing the relative distance between said optical lens and said floating member;

h. a variable resistor for detecting the position of said floating member along the radial line of said disk-shaped recording means along which is displaced said floating member so as to produce the signal representative of the position of said floating member; and i. optical system control means for impressing the voltage to said piezoelectric element in response to the output from said variable resistor, thereby controlling said optical lens so that the point at which is focused the light beam by said optical lens may be maintained within a predetermined range relative to the surface of said disk-shaped recording means.

* * * * *

UNITED STATES PATENT AND TRADEMARK OFFICE
CERTIFICATE OF CORRECTION

PATENT NO. : 4,003,059
DATED : January 11, 1977
INVENTOR(S) : YOSHINORI SUGIURA, et al.

It is certified that error appears in the above-identified patent and that said Letters Patent are hereby corrected as shown below:

Column 2, line 38, change "cannont" to -- cannot --.

Column 6, line 51, change "80/4" to -- $\lambda/4$ --; line 56, at the end of same, insert -- (2) --.

Column 8, line 19, change "$X = \Delta g \cdot -(\Delta g)^2 + f_{12}{}^2 - (f_{12} + f_{11})\Delta g$" to -- $X = \Delta g \cdot D - (\Delta g)^2 + f_{12}{}^2 - (f_{12} + f_{11})\Delta g$ --.

Column 9, line 1, change "cotrol" to -- control --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*